United States Patent
Watanabe (10) Patent No.: US 11,385,070 B2
(45) Date of Patent: Jul. 12, 2022

(54) ROUTE NAVIGATION APPARATUS CAPABLE OF DETERMINING ROUTE BASED ON NON-VERBAL INFORMATION, CONTROL METHOD THEREFOR, INFORMATION PROCESSING SERVER, AND ROUTE NAVIGATION SYSTEM

(71) Applicant: HONDA MOTOR CO., LTD., Tokyo (JP)

(72) Inventor: Kazuya Watanabe, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 115 days.

(21) Appl. No.: 16/707,272

(22) Filed: Dec. 9, 2019

(65) Prior Publication Data

US 2020/0191594 A1 Jun. 18, 2020

(30) Foreign Application Priority Data

Dec. 13, 2018 (JP) .............................. JP2018-233652

(51) Int. Cl.
*G01C 21/36* (2006.01)
*G01C 21/34* (2006.01)

(52) U.S. Cl.
CPC ..... *G01C 21/3629* (2013.01); *G01C 21/3492* (2013.01); *G01C 21/3611* (2013.01)

(58) Field of Classification Search
CPC .................................................. G01C 21/3629
See application file for complete search history.

(56) References Cited

U.S. PATENT DOCUMENTS

| | | | |
|---|---|---|---|
| 2005/0015194 A1* | 1/2005 | Hassdenteufel ... | F02M 25/0827 701/104 |
| 2005/0015197 A1 | 1/2005 | Ohtsuji et al. | |
| 2006/0136203 A1* | 6/2006 | Ichikawa ............ | G10L 21/0208 704/226 |
| 2011/0153191 A1* | 6/2011 | Dhanani ............ | G01C 21/3617 701/533 |
| 2017/0318360 A1* | 11/2017 | Tran ........................ | H04Q 9/00 |

(Continued)

FOREIGN PATENT DOCUMENTS

JP 2009-063534 A * 1/2007
JP 2009-14423 A 1/2009

(Continued)

OTHER PUBLICATIONS

NPL, Braunhofer, Matthias, Location-aware music recommendation, Int J Multimed Info Retr 2, 31-44 (2013). https://doi.org/10.1007/s13735-012-0032-2(hereinafter"Braunhofer").*

(Continued)

*Primary Examiner* — Jean Paul Cass
(74) *Attorney, Agent, or Firm* — WHDA, LLP (57) ABSTRACT

A route navigation apparatus comprises: an output device configured to output music information, in an audible form, to a user; a memory; and at least one processor or circuit which functions as: a selection unit configured to select predetermined music information in accordance with an operation that has been made by the user with respect to the output music information; and a provision unit configured to provide a route corresponding to the selected predetermined music information to the user.

14 Claims, 8 Drawing Sheets

(56) References Cited

U.S. PATENT DOCUMENTS

2020/0079385 A1* 3/2020 Beaurepaire .......... B60W 50/00

FOREIGN PATENT DOCUMENTS

KR       2017-0000919 A   *   1/2017
WO          03/093766 A1     11/2003

OTHER PUBLICATIONS

Google Machine Translation of Chinese Patent Pub. No. CN104321620A to CP filed in 2014 (hereinafter "CP").*
Jones, Matt, et al., ONTRACK: Dynamically adapting music playback to support navigation, Pers Ubiquit Comput (2008) 12:513-525, DOI 10.1007/S00779-007-0155-2 (https://link.springer.com/content/pdf/10.1007/s00779-007-0155-2.pdf).*

* cited by examiner

| ROUTE | LABEL |
|---|---|
| SECTION 811 | MANY ROADSIDE TREES |
| SECTION 812 | MANY ROADSIDE TREES |
| SECTION 813 | LEISURELY VIEWING OF BLUE SKY |
| SECTION 814 | LEISURELY VIEWING OF BLUE SKY |
| SECTION XX | HUSTLE AND BUSTLE OF THE CITY |
| SECTION YY | VIEWING OF OCEAN |
| SECTION ZZ | . . . |

FIG. 8C

| MUSIC | LABEL |
|---|---|
| MUSIC A | HUSTLE AND BUSTLE OF THE CITY |
| MUSIC B | LEISURELY VIEWING OF BLUE SKY |
| MUSIC C | MANY ROADSIDE TREES |

ROUTE NAVIGATION APPARATUS CAPABLE OF DETERMINING ROUTE BASED ON NON-VERBAL INFORMATION, CONTROL METHOD THEREFOR, INFORMATION PROCESSING SERVER, AND ROUTE NAVIGATION SYSTEM

CROSS-REFERENCE TO RELATED APPLICATION(S)

This application claims priority to and the benefit of Japanese Patent Application No. 2018-233652 filed on Dec. 13, 2018, the entire disclosure of which is incorporated herein by reference.

BACKGROUND OF THE INVENTION

Field of the Invention

The present invention relates to a route navigation apparatus capable of determining a route based on non-verbal information, a control method therefor, an information processing server, and a route navigation system.

Description of the Related Art

Conventionally, there is a known route navigation system (also referred to as a navigation system) that navigates a driver who is driving a vehicle through a route to a destination designated by the driver. International Publication No. 2003/093766 suggests a navigation system that, when there are a plurality of route candidates from a current location to a destination, assists a driver in selecting a route by displaying predicted travel periods, fees required to travel the routes, facilities around the routes, and so forth.

Furthermore, in order to realize route prediction with higher accuracy, Japanese Patent Laid-Open No. 2009-14423 discloses a technique to predict a route from a current location to a destination based on virtual vehicle travel data that has been generated by averaging travel data obtained from a plurality of navigation apparatuses.

Meanwhile, there are cases where a selection of a driving or touring route that is enjoyable to take while driving is desired, rather than setting a specific destination. It is considered that non-verbal information, such as the view from the route and the feeling of speed of travel, is useful in the selection of such a route. On the other hand, there is a problem that although the display of facility information and predicted arrival times can be confirmed on a route navigation system, it is difficult to obtain perceptible non-verbal information from which a route can be imagined.

SUMMARY OF THE INVENTION

The present disclosure has been made in consideration of the aforementioned issues, and realizes a technique that makes it possible to, when setting a route to be traveled by a vehicle, determine the route based on non-verbal information.

In order to solve the aforementioned problems, one aspect of the present disclosure provides a route navigation apparatus comprising: an output device configured to output music information, in an audible form, to a user; a memory; and at least one processor or circuit which functions as: a selection unit configured to select predetermined music information in accordance with an operation that has been made by the user with respect to the output music information, and a provision unit configured to provide a route corresponding to the selected predetermined music information to the user.

Another aspect of the present disclosure provides, a route navigation apparatus comprising: a memory; and at least one processor or circuit which functions as: an obtainment unit configured to obtain each of a first sound based on environment information of a first route and a second sound based on environment information of a second route; and an output control unit configured to perform control so as to output each of the first sound and the second sound, in a selectable manner, to a user so that one of the first route and the second route is selected.

Still another aspect of the present disclosure provides, a method for controlling a route navigation apparatus comprising: outputting music information, in an audible form, to a user; selecting predetermined music information in accordance with an operation that has been made by the user with respect to the output music information, and providing a route corresponding to the selected predetermined music information to the user.

Yet another aspect of the present disclosure provides, an information processing server that communicates with a route navigation apparatus including: an output device configured to output music information, in an audible form, to a user; a selector configured to select predetermined music information in accordance with an operation that has been made by the user with respect to the output music information, and a display configured to display a route corresponding to the selected predetermined music information to the user, the information processing server comprising: a determination unit configured to determine the route corresponding to the predetermined music information based on the predetermined music information.

Still yet another aspect of the present disclosure provides, a route navigation system comprising a route navigation apparatus and an information processing server, the route navigation apparatus including: an output device configured to output music information, in an audible form, to a user; a selection unit configured to select predetermined music information in accordance with an operation that has been made by the user with respect to the output music information; and a provision unit configured to provide a route corresponding to the selected predetermined music information to the user, and the information processing server including: a determination unit configured to determine the route corresponding to the predetermined music information based on the predetermined music information.

According to the present invention, when setting a route to be traveled by a vehicle, the route can be determined based on non-verbal information.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

DESCRIPTION OF THE EMBODIMENTS

First Embodiment

Below, an exemplary embodiment of the present invention will be described in detail with reference to the drawings.

<Configuration of Route Navigation System>

Figure 1:
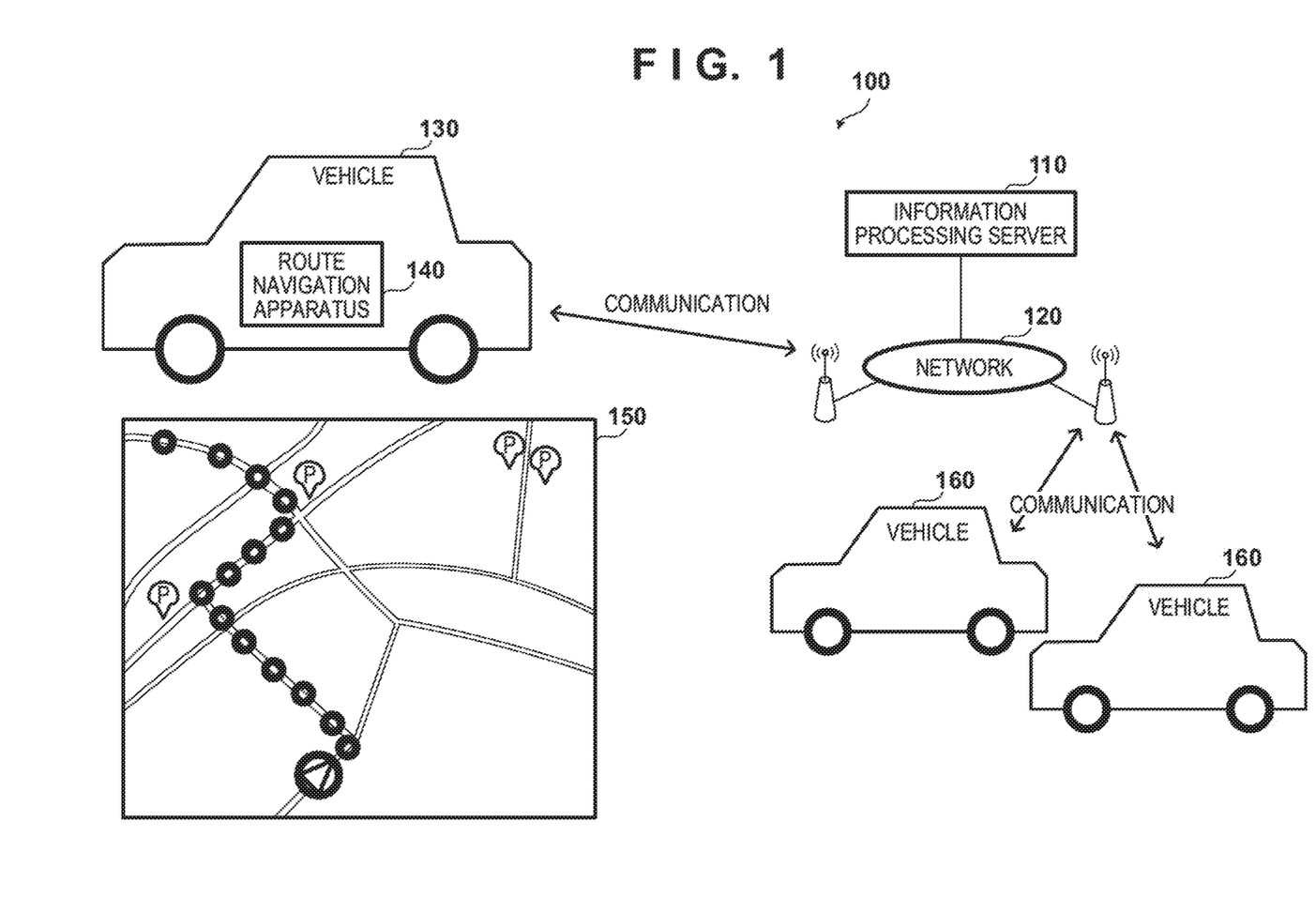
FIG. 1 is a diagram showing an example of a route navigation system according to the present invention.

A description is now given of a configuration of a route navigation system 100 according to the present embodiment with reference to FIG. 1. A vehicle 130 and vehicles 160 are electric-powered vehicles, such as electric automobiles, provided with a route navigation apparatus 140. The vehicle 130 and the vehicles 160 include a vehicle having an automated driving function, and a vehicle that is driven manually by a driver.

Figure 7:
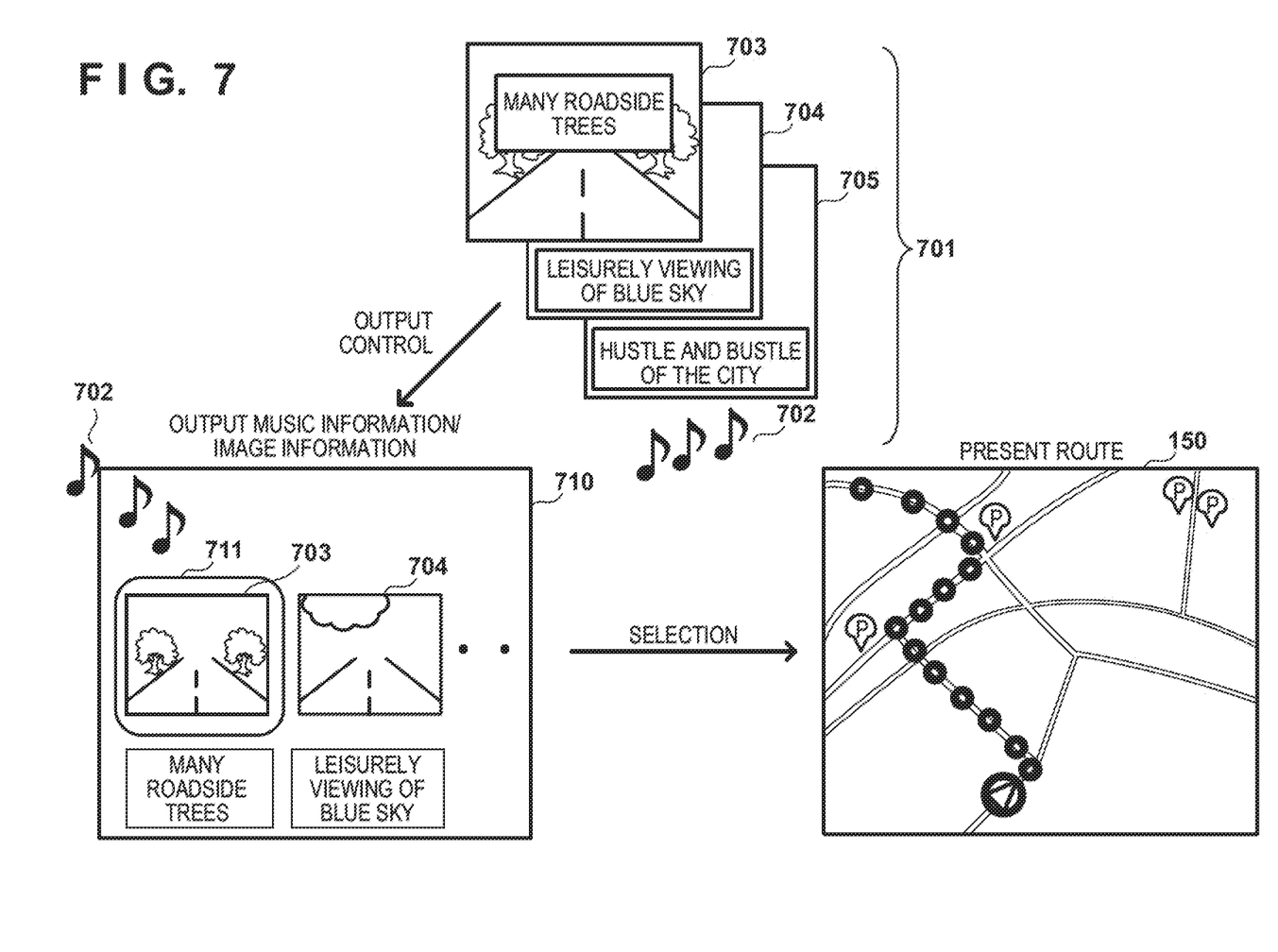
FIG. 7 is a diagram illustrating an example in which a route is presented by selecting multimedia information on the route navigation apparatus.

Using various in-vehicle sensors of the vehicle 130 and the vehicles 160, the route navigation apparatus 140 collects information related to vehicle behaviors (e.g., CAN information, such as the speed, acceleration, and brake applications of the vehicle) and information of the surroundings of a travel route (e.g., images of a driving recorder). These pieces of data can be transmitted to an information processing server 110 as vehicle information. This vehicle information may compose a part of floating data (also referred to as probe data, traffic information, and the like). The vehicle information may further include other information, such as identification information of the vehicle and identification information of a user of the vehicle. The vehicle information is transmitted to the information processing server 110 at a constant interval, or in response to the occurrence of a specific event, in vehicle information transmission processing, which will be described later. Also, the vehicle 130 performs route presentation processing, which will be described later. Note that in the route presentation processing, which will be described later, a user (here, referring to a driver) of the vehicle 130 does not specify a destination, but selects desired music information (and image) based on image information (e.g., a jacket photograph) corresponding to music information (e.g., BGM) being played. In this way, a route that fits the atmosphere is obtained. For example, when the user wants to set a route without specifying a destination, multimedia information 701 shown in FIG. 7 is used, which includes pieces of music information 702 corresponding to information of such atmospheres as "many roadside trees", "leisurely viewing of blue sky", and "the hustle and bustle of the city", and image information 703 (or 704, 705) corresponding to these pieces of music information. For example, the user selects information indicating a desired atmosphere while viewing and listening to a display 710, by which the image information 703 and the image information 704 are output in a selectable manner, and the output of music information corresponding to image information designated by a cursor 711. Once the user has selected music information and the like of a desired atmosphere, the route navigation apparatus 140 obtains information of a route corresponding to the selected music information and the like from the information processing server 110, and provides the same as a display 150 to the user. The display 150 schematically shows an example of a route displayed on a display unit 306, and displays a route corresponding to the selected music information and the like. In this way, when the user wants to drive without specifically setting a destination, such as when touring is the purpose, a route can be selected based on non-verbal information. Although the following description will be given using a case where both of music information and image information are output to the user for selection as an example, only one of them may be output to the user for selection.

The information processing server 110 is composed of one or more server apparatuses, obtains vehicle information transmitted from the vehicle 130 and the vehicles 160 via a network 120, and accumulates the obtained vehicle information as route environment information. As will be described later, the route environment information includes, for example, information related to vehicle behaviors, such as the speed and the number of times braking was performed, and information of the surroundings of a travel route, such as images of the driving recorder. Also, the information processing server 110 executes route provision processing. Although described in detail later, the information processing server 110 associates the characteristics of the route environment information with music information (and image information) based on the vehicle information obtained from the vehicles 160 and the like. The information processing server 110 transmits music information and image information for selecting a route to the route navigation apparatus 140, and receives predetermined music information and image information that were selected from the transmitted information. Furthermore, the information processing server 110 determines a route for navigation based on the selected predetermined music information and image information, and transmits the determined route for navigation to the route navigation apparatus 140 so that the route navigation apparatus 140 provides the determined route for navigation to the user. The network 120 includes, for example, a communication network, such as the Internet and a mobile telephone network, and transmits information between the information processing server 110 and the vehicle 130 and the vehicles 160.

<Configuration of Information Processing Server>

Figure 2:
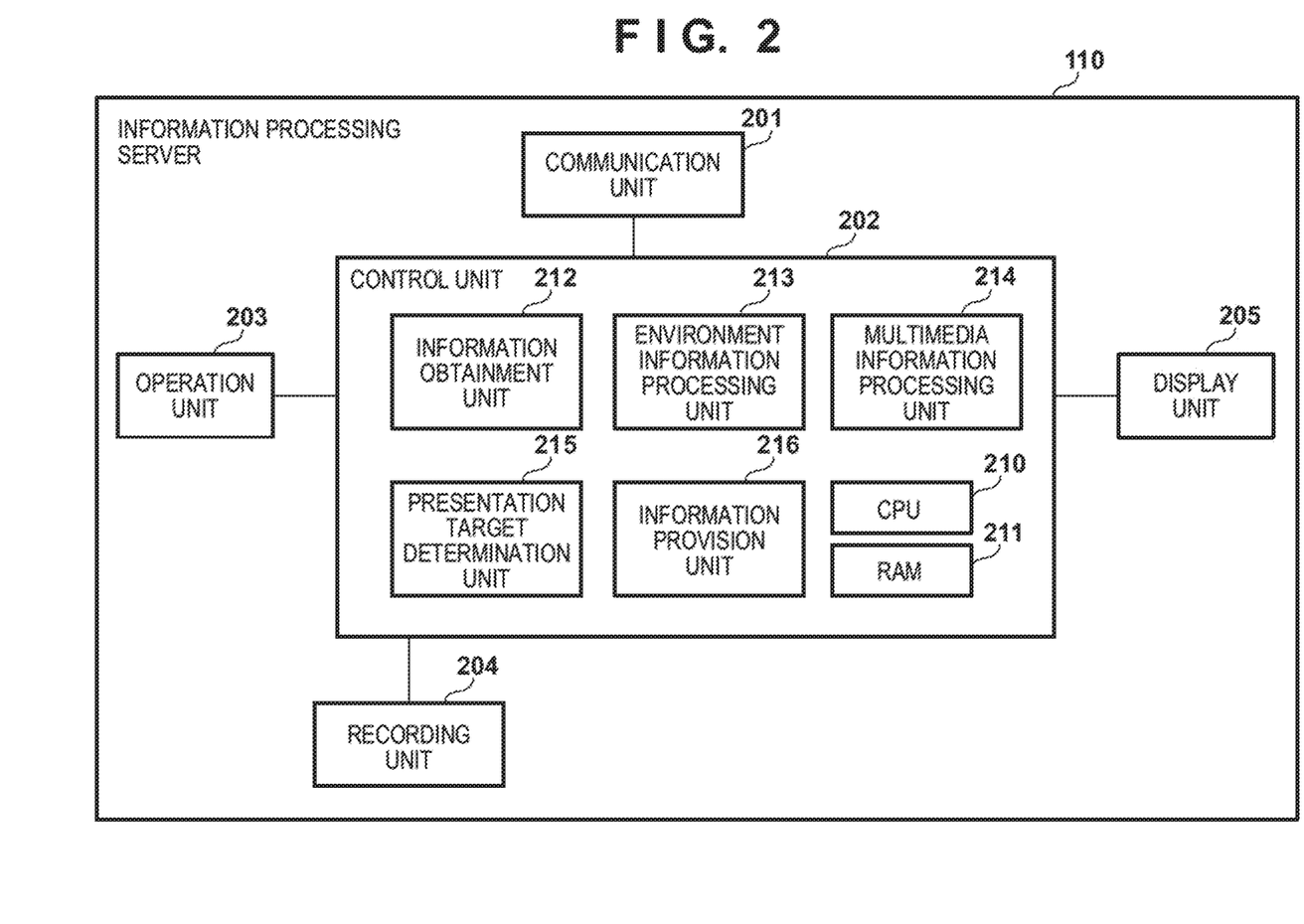
FIG. 2 is a block diagram showing an exemplary functional configuration of an information processing server in the present embodiment.

Next, an exemplary functional configuration of the information processing server 110 will be described with reference to FIG. 2. Note that respective functional blocks described with reference to the following diagrams may be integrated or divided, and a described function may be realized by another block. Furthermore, an item described as hardware may be realized as software, or vice versa.

A communication unit 201 includes a communication circuit for communicating with the route navigation apparatus 140 of the vehicle 130 or the vehicles 160 via the network 120. The communication unit 201 transmits information that is controlled by a control unit 202 and intended for an external apparatus, and receives information from an external apparatus.

The control unit 202 includes a CPU 210, which is one or more computational apparatuses, and a RAM 211. The control unit 202 controls the operations of each component inside the control unit 202 and controls the operations of each component of the information processing server 110 by deploying programs stored in a recording unit 204 to the RAM 211 and executing the programs. Also, the control unit 202 executes the route provision processing, which will be described later. The RAM 211 includes, for example, a volatile storage medium, such as a DRAM, and temporarily stores parameters for the execution of programs by the control unit 202, a processing result, and the like.

An operation unit 203 is a module that accepts an operation instruction that has been issued either remotely or via an operation member, such as a keyboard and a mouse, for the issuance of the operation instruction by an administrator of the information processing server 110, and notifies the control unit 202 of operation information upon accepting the operation instruction.

The recording unit 204 includes, for example, a nonvolatile recording medium, such as a semiconductor memory, and has recorded therein setting values that are necessary for the operations of the information processing server 110. Also, the recording unit 204 records vehicle information transmitted from the vehicle 130 and the vehicles 160 (i.e., information related to vehicle behaviors, such as the vehicle speed, and information of the surroundings of a travel route, such as images of the driving recorder) into an environment information database. Furthermore, the recording unit 204 records, into a multimedia information database, music information (e.g., BGM) to which information (label) of an atmosphere, such as "many roadside trees", "leisurely viewing of blue sky", and "the hustle and bustle of the city", has been appended, and image information (e.g., a jacket photograph) to which information of a similar atmosphere has been appended.

A display unit 205 includes, for example, a display panel, such as an LCD and an OLED, and displays a setting user interface that is intended for an administrator or the like to set the information processing server 110. Alternatively, it is possible to perform display control in which information that can be displayed by an external apparatus is transmitted.

An information obtainment unit 212 obtains vehicle information transmitted from the vehicle 130 and the vehicles 160 via the communication unit 201. The information obtainment unit 212 records the obtained vehicle information into the environment information database. Also, the information obtainment unit 212 obtains music information and image information to which information of an atmosphere has been appended from a non-illustrated external apparatus that provides image information, and records them into the multimedia information database.

An environment information processing unit 213 analyzes the characteristics of route environment information obtained from vehicle information recorded in the environment information database (e.g., at an interval of a predetermined distance) using a machine learning algorithm, and learns association with information of an atmosphere of a route. Furthermore, when a specific route has been input, the environment information processing unit 213 outputs information of an atmosphere of a route that is estimated to have the highest correspondence with the input characteristics using the result of learning that has already been performed. Although the following describes a case where a deep neural network model is adopted, no limitation is intended by this. The machine learning algorithm can be selected from, for example, linear regression, nonlinear regression, logistic regression, a support-vector machine (SVM), a decision tree, a perceptron, a random forest, AdaBoost, naive Bayes, the k-nearest neighbors algorithm (KNN), a neural network (NN), a convolutional neural network (CNN), and so forth.

A multimedia information processing unit 214 retrieves multimedia information (i.e., music information and image information) corresponding to the information of the atmosphere of the route from the multimedia information database, and outputs the multimedia information. Therefore, when a specific route has been input, the information processing server 110 can output music information and image information that are estimated to have the highest correspondence with the input characteristics using the result of processing by the environment information processing unit 213.

Upon receiving a request for obtainment of multimedia information from the route navigation apparatus 140 of the vehicle 130, a presentation target determination unit 215 determines multimedia information to be displayed on the route navigation apparatus 140, and transmits the determined multimedia information to the route navigation apparatus 140. The presentation target determination unit 215 selects a plurality of settable route candidates based on, for example, a current location of the route navigation apparatus 140 included in the request for obtainment of multimedia information. Then, each of the selected plurality of route candidates is input to the environment information processing unit 213, information of the atmospheres of the route candidates is output, and based on the information of the atmospheres of the route candidates, the multimedia information processing unit 214 outputs the associated music information and image information; as a result, the presentation target determination unit 215 obtains the music information and image information.

Upon receiving the multimedia information (music information and image information) selected by the route navigation apparatus 140, an information provision unit 216 specifies a route corresponding to the selected multimedia information, and transmits the specified route to the route navigation apparatus 140. For example, the information provision unit 216 specifies a route candidate corresponding to the selected multimedia information from among the route candidates processed by the presentation target determination unit 215, and transmits the specified route candidate as the determined route to the route navigation apparatus 140.

<Configuration of Route Navigation Apparatus in Vehicle>

Figure 3:
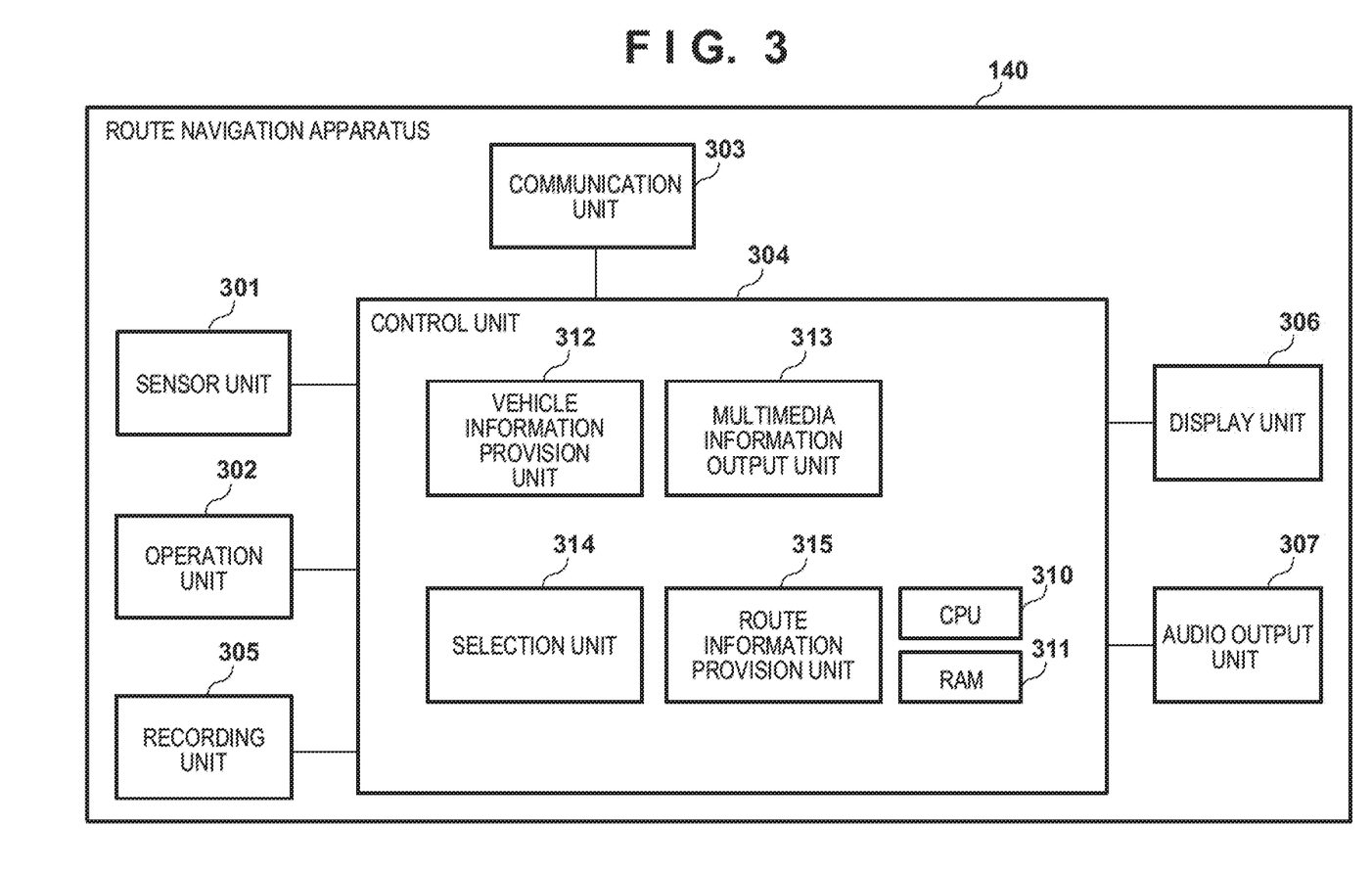
FIG. 3 is a block diagram showing an exemplary functional configuration of a route navigation apparatus in the present embodiment.

Next, an exemplary functional configuration of the route navigation apparatus 140 in the vehicle 130 will be described with reference to FIG. 3. Note that the configuration shown in FIG. 3 is an example, and a part of functional blocks may be provided outside the route navigation apparatus 140 (i.e., inside the vehicle 130). For example, a sensor unit 301, a communication unit 303, a recording unit 305, a display unit 306, and an audio output unit 307 may be provided outside the route navigation apparatus 140. Furthermore, it is assumed that a similar route navigation apparatus 140 is provided in the vehicles 160. Although the following description will be given using a case where the route navigation apparatus 140 is an onboard apparatus as an example, the route navigation apparatus 140 is not limited to the onboard apparatus, and may be an electronic device, such as a personal computer and a smartphone, as long as it can obtain information related to vehicle behaviors of the vehicle 130.

The sensor unit 301 includes various types of sensors for obtaining information related to vehicle behaviors, that is to say, information related to the vehicle location, the vehicle speed, the vehicle acceleration, whether the brake was actuated, the amount of battery charge, and the like. The sensors include, for example, a GPU, a speed sensor, an acceleration sensor, a sensor that measures the amount of battery charge, a sensor that detects the actuation of the brake, and the like. Data obtained from the sensors is partially or entirely recorded into the recording unit 305 and later transmitted to the information processing server 110 via the communication unit 303. Furthermore, the sensor unit 301 includes a camera for obtaining information of the surroundings of a travel route, that is to say, images of the driving recorder, and LIDAR (Light Detection and Ranging).

An operation unit 302 includes operation members, such as a touchscreen and buttons, of the route navigation apparatus 140, and can perform an operation on a GUI that is displayed on the display unit 306 for the purpose of route navigation (navigation) and various types of operations. The communication unit 303 is, for example, a communication device including a communication circuit and the like, and exchanges necessary data with the information processing server 110 using connection to the network 120 via, for example, mobile communication, such as LTE.

A control unit 304 includes a CPU 310, which is one or more computational apparatuses, and a RAM 311, and the operations of each functional block inside the control unit 304 and each component inside the route navigation apparatus 140 are controlled by the CPU 310 executing programs recorded in, for example, the recording unit 305.

A vehicle information provision unit 312 provides data collected by the sensor unit 301 (information related to vehicle behaviors and information of the surroundings of a travel route) as vehicle information to the information processing server 110.

A multimedia information output unit 313 outputs pieces of multimedia information (i.e., image information and audio information) received from the information processing server 110 to the user, in a viewable and audible form, via the display unit 306 and the audio output unit 307. In accordance with an operation made by the user with respect to the output pieces of multimedia information, a selection unit 314 selects a predetermined piece of multimedia information from among the output pieces of multimedia information.

A route information provision unit 315 obtains a route corresponding to the predetermined piece of multimedia information selected by the user from the information processing server 110, and provides the route to the user via the display unit 306. The route provided by the route information provision unit 315 is displayed on the display unit 306 as, for example, the above-described display 150.

The recording unit 305 includes, for example, a nonvolatile memory, such as a semiconductor memory, and holds a database that stores information related to vehicle behaviors and information of the surroundings of a travel route for a certain period, map information for route navigation, and the like. The recording unit 305 also holds programs executed by the control unit 304.

The display unit 306 includes, for example, a display panel, such as an LCD and an OLED, and displays a map that is intended to be displayed during route navigation, a user interface for operations, a user interface for configuring various types of settings of the route navigation apparatus and performing various types of operations inside the vehicle 130, and the like. The display unit 306 can output image information to the user in accordance with an instruction from the control unit 304. The audio output unit 307 includes a speaker that can output, for example, audio information to the user.

<Sequence of Operations of Vehicle Information Transmission Processing in Route Navigation Apparatus>

Figure 4:
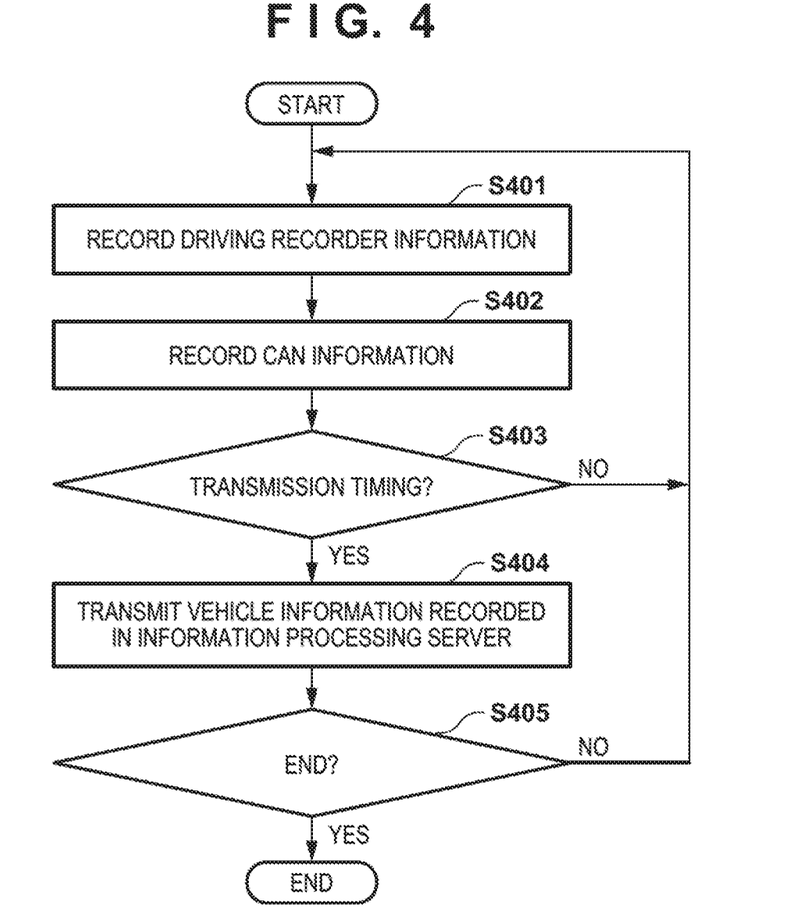
FIG. 4 is a flowchart showing a sequence of operations of vehicle information transmission processing in the route navigation apparatus in the present embodiment.

Next, a description is given of a sequence of operations of vehicle information transmission processing in the route navigation apparatus 140 with reference to FIG. 4. Note that the present processing is realized by the CPU 310 of the control unit 304 executing a program recorded in the recording unit 305. The control unit 304 starts when, for example, power is supplied to the route navigation apparatus 140.

In step S401, the control unit 304 records information of the driving recorder (i.e., information of the surroundings of a travel route) into the recording unit 305. In step S402, the control unit 304 records information related to vehicle behaviors (i.e., CAN information) into the recording unit 305.

In step S403, the control unit 304 determines whether it is currently a timing to transmit vehicle information to the information processing server 110. The control unit 304 refers to, for example, internal timer information, and if a predetermined or longer period has elapsed since a reference time, the control unit 304 determines that it is currently the transmission timing, and proceeds to step S404. Otherwise, the control unit 304 returns to step S401, and repeats the processing.

In step S404, the control unit 304 transmits vehicle information recorded in the recording unit 305 to the information processing server 110. At this time, the control unit 304 determines whether the vehicle information is information that has not been transmitted to the information processing server 110, and transmits only information that is yet to be transmitted to the information processing server 110.

In step S405, the control unit 304 determines whether to end the vehicle information transmission processing. If the processing is not to be ended, the control unit 304 returns to step S401 again, and repeats the processing. Otherwise, the control unit 304 ends the vehicle information transmission processing.

<Sequence of Operations of Route Provision Processing in Information Processing Server>

Figure 5:
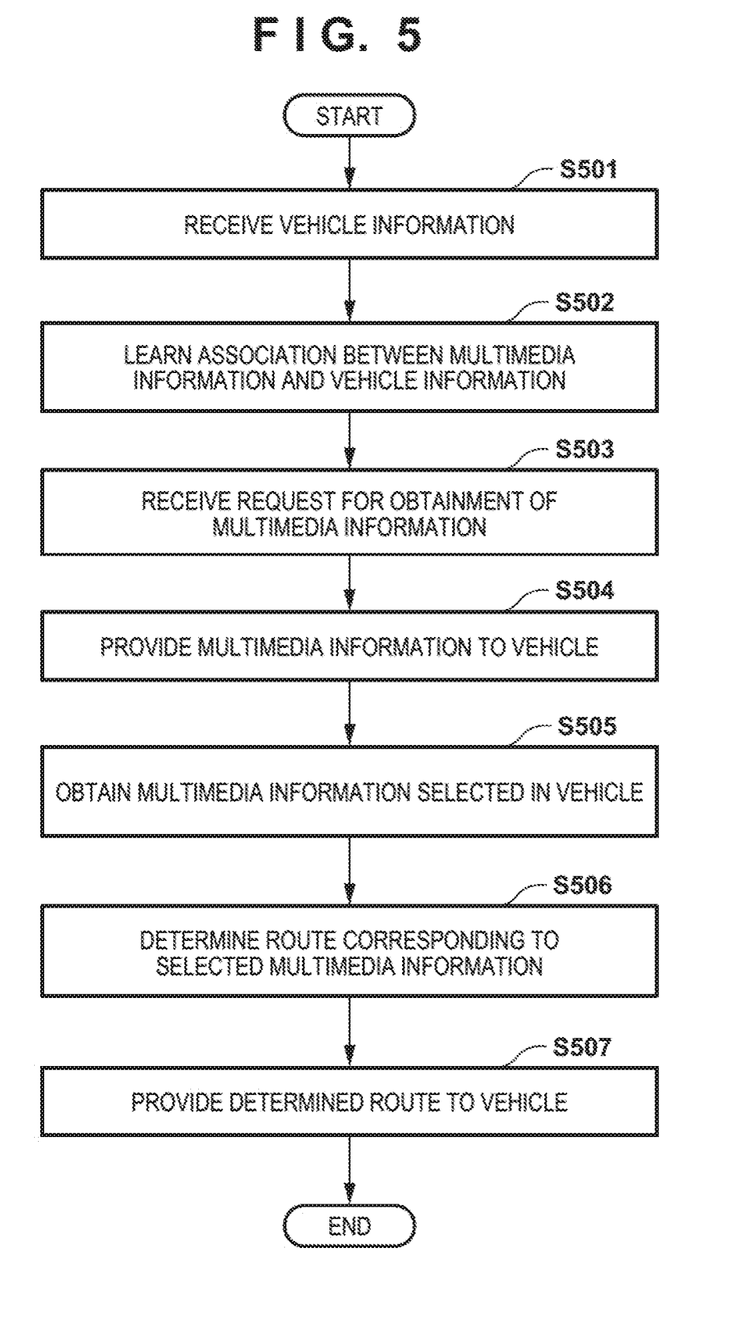
FIG. 5 is a flowchart showing a sequence of operations of route provision processing in the information processing server in the present embodiment.
Figure 8A:
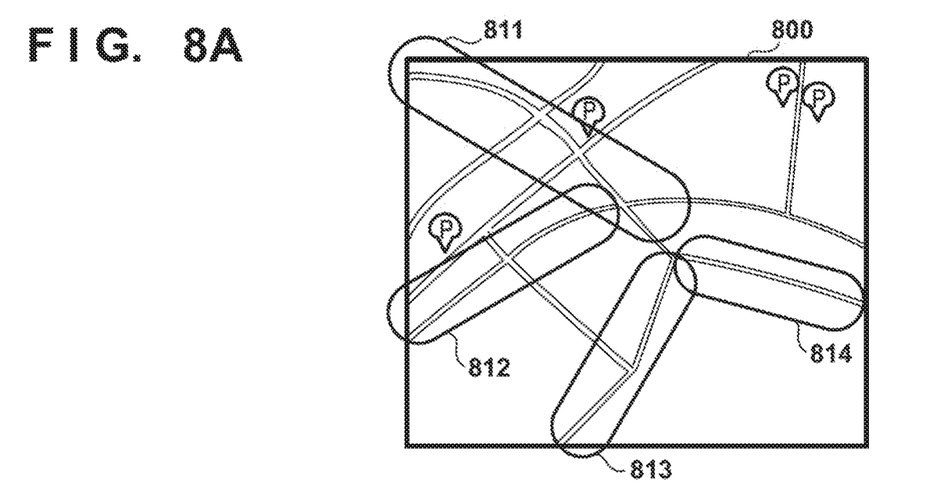
FIGS. 8A to 8C are diagrams illustrating sections that compose a route and a structure of multimedia information on the information processing server.
Figure 8B:
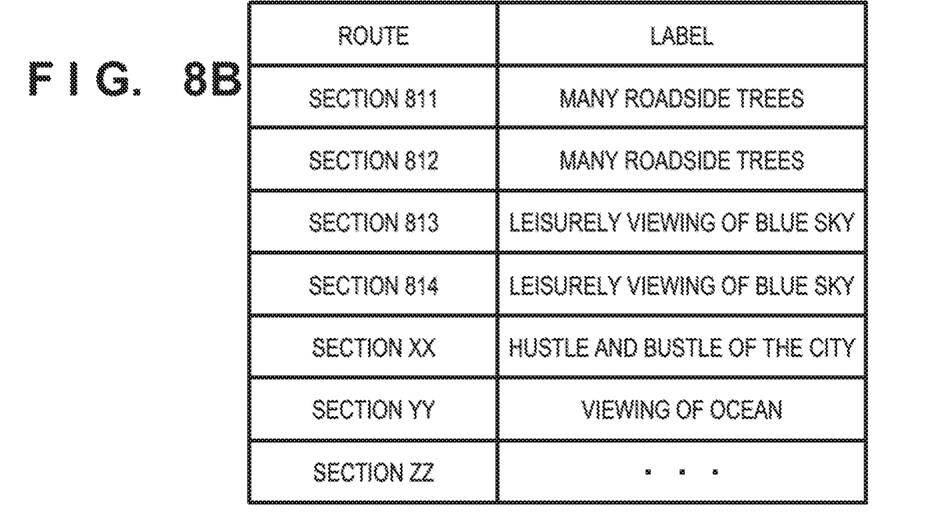
Figure 8C:
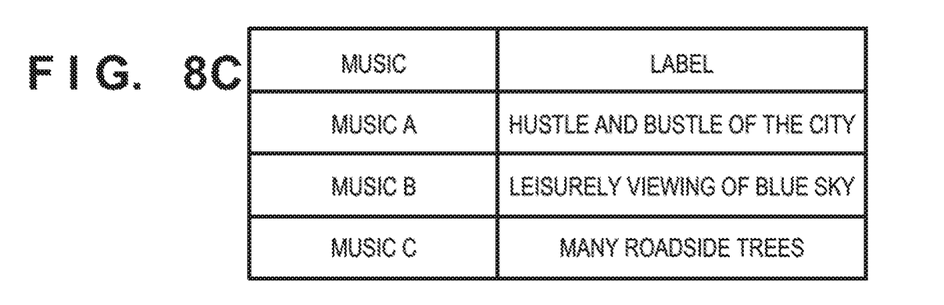

Next, a description is given of a sequence of operations of route provision processing in the information processing server 110 with reference to FIG. 5. Note that the present processing is realized by the CPU 210 of the control unit 202 executing a program recorded in the recording unit 204. It is assumed that a predetermined amount of vehicle information has been stored in advance in the environment information database described below, and training data that has used such vehicle information has been generated. Specifically, at least a part of the vehicle information recorded in the environment information database has been labeled, manually or automatically, by a manager of the information processing server 110 or a third person so as to be used as training data used in machine learning. Regarding the training data, for example, one section of a route traveled by the vehicle and one section's worth of images of the driving recorder at the time of traveling the route are extracted, and information (label) of an atmosphere, such as "many roadside trees", "leisurely viewing of blue sky", and "the hustle and bustle of the city", is allocated to the route in that section. For example, FIGS. 8A to 8C show an example in which a route is divided into sections, and vehicle information corresponding to sections 811 to 814 is used as training data. Based on the images of the driving recorder at the time of traveling sections 811 to 814 by the vehicle, a third person manually or automatically appends correct labels of information of atmospheres, thereby generating training data in which sections are associated with labels of information of atmospheres as shown in FIG. 8B. Furthermore, aside from the training data that uses the images of the driving recorder, association data is also generated in which music information is associated with labels of information of atmospheres as shown in FIG. 8C. In this association data, information of atmospheres with which music information (e.g., BGM) heard is associated is appended. Association data similar to that of FIG. 8C is generated also with respect to image information.

In step S501, the information obtainment unit 212 of the control unit 202 receives vehicle information from the route navigation apparatus 140 of the vehicle 130. The information obtainment unit 212 stores the received vehicle information into the environment information database of the recording unit 204 in connection with identification information of the vehicle.

Although vehicle information that has been newly added to the environment information database can be partially or entirely used in generating another training data, the generation of the training data that uses the newly added vehicle information is performed separately from the present route provision processing.

In step S502, the control unit 202 learns association between multimedia information and the vehicle information. For example, the environment information processing unit 213 uses a deep neural network that, when information related to vehicle behaviors in traveling a certain section (the speed, the number of times braking was performed, etc.) and information of the surroundings of a travel route (images of the driving recorder) are input, outputs information of an atmosphere that is estimated with the highest probability with respect to that section. Regarding the information surrounding the travel route, information of a road type related to the route, facilities around the route, and the environment around the route may be extracted in advance based on the images of the driving recorder. Using a large amount of training data, the environment information processing unit 213 repeatedly inputs vehicle information and a correct label to the deep neural network on a section-by-section basis, and optimizes weighting of the deep neural network (places the deep neural network in a trained state). By using the result of learning that has already been performed (the trained neural network), when vehicle information of a certain section that is not included in the training data is input to the deep neural network, information of an atmosphere that has the highest possibility of corresponding to this section is output. The multimedia information processing unit 214 outputs corresponding music information based on the information of the atmosphere output from the deep neural network. Although the neural network exemplarily outputs information of an atmosphere with respect to vehicle information of a certain section in the foregoing example, it is possible to use a neural network that outputs music information representing an atmosphere of a route with respect to vehicle information of a certain section. Furthermore, it goes without saying that the foregoing processing for optimizing weighting of the deep neural network (i.e., learning) may be performed in advance using training data that has been generated separately from the present route provision processing (at any timing after the generation of the training data).

In step S503, the control unit 202 receives a request for obtainment of multimedia information from the route navigation apparatus 140. The request for obtainment of multimedia information includes, for example, a current location of the route navigation apparatus 140 and a distance that can be traveled in accordance with a charge state.

In step S504, the control unit 202 provides multimedia information to the vehicle (route navigation apparatus 140). Specifically, the presentation target determination unit 215 of the control unit 202 selects a plurality of settable route candidates based on, for example, the current location and the distance that can be traveled of the route navigation apparatus 140, which are included in the received request for obtainment of multimedia information. Then, each of the selected plurality of route candidates is input to the environment information processing unit 213; as a result, music information and image information that are associated with the respective route candidates are obtained. Note that when a route candidate is composed of a plurality of sections, for example, the environment information processing unit 213 outputs information of an atmosphere on a section-by-section basis, and the multimedia information processing unit 214 outputs music information and the like corresponding to the information of the atmosphere on a section-by-section basis. Therefore, the presentation target determination unit 215 determines music information and image information by specifying the most frequent music information (and image information) within one route. That is to say, in the example shown in FIG. 8A, when one route candidate is a route from section 813 to section 814, "music B" corresponding to "leisurely viewing of blue sky" is determined. In other words, for one route candidate, one representative piece of music information and one representative piece of image information are determined. The presentation target determination unit 215 provides the determined music information and image information to the vehicle. For example, when three route candidates have been selected based on the distance that can be traveled from the current location, three pieces of music information and three pieces of image information are provided to the route navigation apparatus 140.

Note that when the plurality of pieces of music information to be provided include identical pieces of music information (e.g., two pieces of music B), the presentation target determination unit 215 changes (e.g., makes a musical arrangement to) the characteristics of one of the identical pieces of music information based on environment information of the associated route so as to make the identical pieces of music information different from each other. Regarding the musical arrangement, for example, based on information related to vehicle behaviors on the route, the tempo of music information can be speeded up with an increase in the average vehicle speed, or the tempo of music information can be slowed down with an increase in the number of times braking was performed. Alternatively, when the plurality of pieces of music information and image information to be provided include both identical pieces of music information and identical pieces of image information, the presentation target determination unit 215 may change the characteristics of music information based on environment information of the associated route.

In step S505, the information provision unit 216 of the control unit 202 obtains predetermined multimedia information (music information and image information) selected on the route navigation apparatus 140 of the vehicle. In step S506, the information provision unit 216 determines a route corresponding to the multimedia information selected on the route navigation apparatus 140 using the routes that were associated with music information in step S504, and in step S507, the determined route is transmitted to the route navigation apparatus 140 of the vehicle. Thereafter, the control unit 202 ends the route provision processing.

<Route Presentation Processing in Route Navigation Apparatus>

Figure 6:
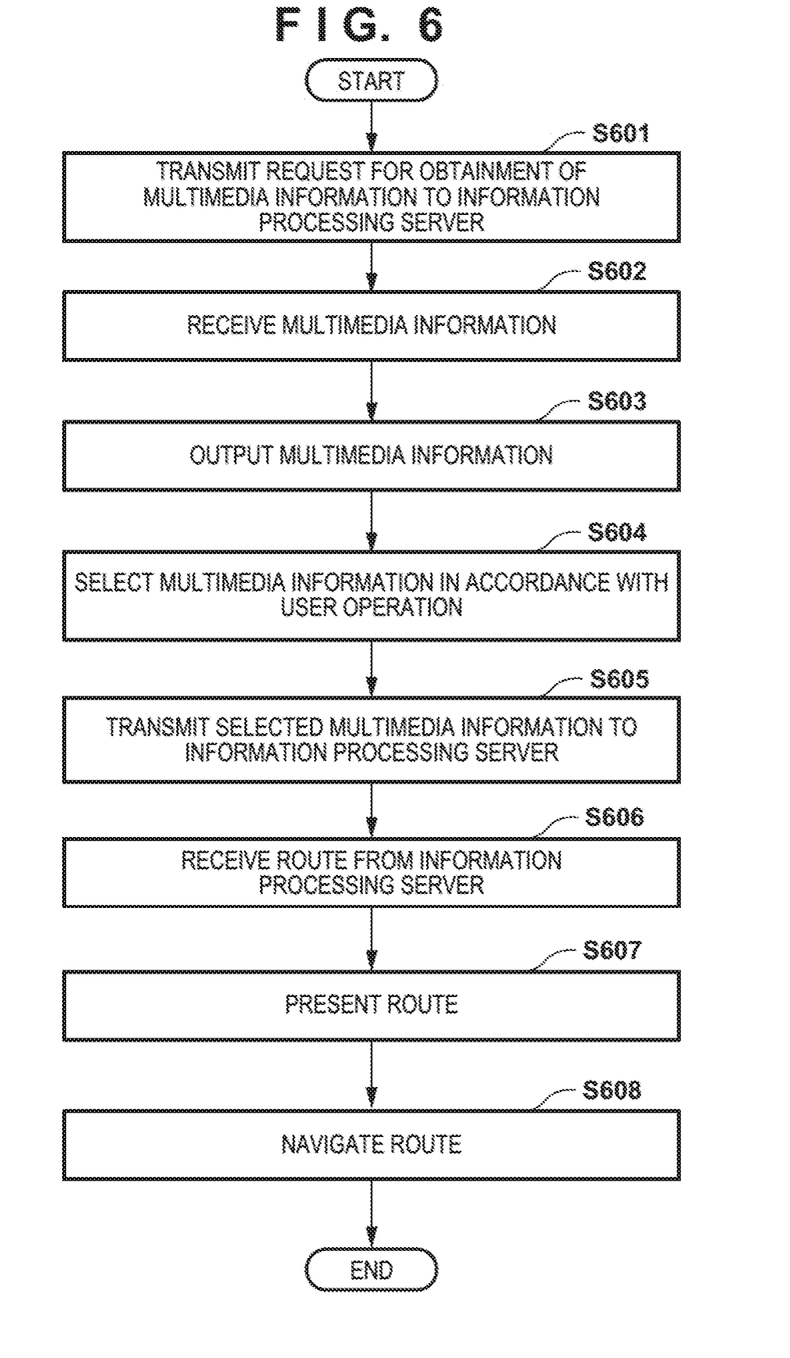
FIG. 6 is a flowchart showing a sequence of operations of route presentation processing in the route navigation apparatus in the present embodiment.

Next, a description is given of a sequence of operations of the route presentation processing in the route navigation apparatus 140 with reference to FIG. 6. Note that the present processing is realized by the CPU 310 of the control unit 304 executing a program recorded in the recording unit 305. The control unit 304 starts the present processing upon, for example, accepting an operation of searching for a route from the user.

In step S601, the control unit 304 transmits a request for obtainment of multimedia information (music information and image information) to the information processing server 110. At this time, the request for obtainment includes a current location and a distance that can be traveled of the route navigation apparatus 140. Note that the user may input a travel period for which he/she wants to travel instead of the distance that can be traveled.

In step S602, the control unit 304 receives multimedia information (music information and image information) that is provided by the information processing server 110 in step S504. In step S603, the control unit 304 outputs the received multimedia information (music information and image information). The music information is output in an audible form by the audio output unit 307 to the user. The image information is displayed in a viewable form by the display unit 306 to the user.

In step S604, the control unit 304 selects multimedia information desired by the user in accordance with an operation made by the user (e.g., a touch operation made by the user) with respect to the output multimedia information. In step S605, the control unit 304 transmits the multimedia information selected in step S604 to the information processing server 110.

In step S605, the control unit 304 receives a route that is provided by the information processing server 110 in step S607, and in step S606, the received route is presented on the display unit 306. Once the user has decided to travel by the vehicle along the presented route, the control unit 304 provides navigation through this route in step S608, and ends the present processing when the route related to the navigation has been traveled. Note that the route navigation apparatus 140 may accept a feedback (user evaluation) from the user so that, when the selected audio information and image information cause a sense of discomfort in connection with the view from the traveled route and the tempo, a similar combination does not occur. In this case, the route navigation apparatus 140 transmits feedback information and information of the route to the information processing server 110. The information processing server 110 may learn to change weighting of the deep neural network so that the selected music information and image information (in a direct sense, information of an atmosphere) will not be easily selected with respect to this route.

As described above, the present embodiment lets the user make a selection using music information and image information that have been determined based on information related to vehicle behaviors and information of the surroundings of a travel route, and provides a route in accordance with the selection. In this way, when the user wants to drive without specifically setting a destination, such as when touring is the purpose, a route can be selected intuitively.

Note that in the above-described example, the information processing server 110 determines multimedia information from route candidates based on the trained neural network in step S504, and determines a route corresponding to multimedia information selected on the route navigation apparatus in step S506. However, these processes may be performed by the route navigation apparatus 140. For example, information of the trained neural network that has performed learning in the information processing server is transmitted to the route navigation apparatus 140. The route navigation apparatus 140 may determine multimedia information from route candidates using the received information of the trained neural network without performing steps S601 and S602, and output a plurality of pieces of multimedia information in step S603. This information of the neural network is, for example, information for reconfiguring the trained neural network, and includes values of weighting parameters of respective neurons and values of hyper parameters to be used by the neural network. In this case, for example, the route navigation apparatus 140 may hold the result of learning in advance in the storage unit 305. Furthermore, after selecting multimedia information in step S604, a route corresponding to the selected multimedia information may be determined without performing steps S605 and S606. In this way, learning of the neural network, which is a large processing load, is performed in the information processing server 110, whereas processing for determining multimedia information, determining a route, and the like is executed on the local side: as a result, high responsiveness can be achieved.

Furthermore, in the above-described example, the route navigation apparatus 140 receives multimedia information (music information and image information) from the information processing server (step S602), and outputs this multimedia information to the user for selection (step S603). However, the route navigation apparatus 140 may output music information and image information that have been recorded in advance in the recording unit 305 of the route navigation apparatus 140 to the user for selection of predetermined music information and image information.

<Summary of Embodiment>

1. A route navigation apparatus (e.g., reference sign 140) of the above-described embodiment comprises:

an output device (e.g., 307, 313, S603) configured to output music information, in an audible form, to a user;

a memory; and at least one processor or circuit which functions as:

a selection unit (e.g., 314) configured to select predetermined music information in accordance with an operation that has been made by the user with respect to the output music information; and a provision unit (e.g., 315) configured to provide a route corresponding to the selected predetermined music information to the user.

This embodiment makes it possible to provide a route navigation apparatus that, when setting a route to be traveled by a vehicle, can determine the route based on non-verbal information.

2. In the above-described embodiment, the output device (e.g., 306) is capable of further outputting image information corresponding to the output music information.

According to this embodiment, a route can be determined based on information with which the views and the like are visually associable.

3. In the above-described embodiment, the at least one processor or circuit further functions as a determination unit configured to determine the route provided by the provision unit to the user based on the selected predetermined music information.

According to this embodiment, training of the neural network, which is a large processing load, is performed in the information processing server 110, whereas processing for determining multimedia information, determining a route, and the like is executed on the local side; as a result, high responsiveness can be achieved.

4. In the above-described embodiment, the at least one processor or circuit further functions as a transmission unit (e.g., 313) configured to transmit the selected predetermined music information to an external apparatus (e.g., 110) that includes a determination unit (e.g., 215) configured to determine the route provided to the user based on the received music information, and a reception unit (e.g., 315) configured to receive the route determined by the external apparatus from the external apparatus so as to provide the route via the provision unit.

According to this embodiment, as processing for determining multimedia information, determining a route, and the like is executed on the server side, more advanced algorithms can be used, and highly accurate processing can be performed.

5. In the above-described embodiment, the music information output from the output device is associated with characteristics of environment information of a route (e.g., FIGS. 8A to 8C).

According to this embodiment, a route can be selected by selecting music information that represents a desired route atmosphere.

6. In the above-described embodiment, the environment information of the route includes information related to a behavior of a vehicle that travels the route.

According to this embodiment, the characteristics of the route can be represented based on the information related to the behavior of the vehicle, and associated with music information.

7. In the above-described embodiment, the information related to the behavior of the vehicle includes at least one of a speed, acceleration, and the number of brake applications of the vehicle that travels the route.

According to this embodiment, the characteristics of the route can be represented based on at least one of the speed, the acceleration, and the number of brake applications of the vehicle that travels the route, and associated with music information.

8. In the above-described embodiment, the environment information of the route further includes information of at least one of a road type related to the route, a facility around the route, and an environment around the route.

According to this embodiment, the characteristics of the route can be represented based on at least one of the road type related to the route, the facility around the route, and the environment around the route, and associated with music information.

9. In the above-described embodiment, the music information output from the output device is associated with characteristics of environment information of a route from a current location of the route navigation apparatus.

According to this embodiment, the characteristics of the route from the current location can be represented based on the information related to the behavior of the vehicle, and associated with music information.

10. In the above-described embodiment, when the music information to be output is a plurality of identical pieces of music information, characteristics of one of the identical pieces of music information has been changed based on the associated environment information of the route when the music information is output from the output device.

According to this embodiment, even when there are few types of music information from which the selection is made and there is an overlap in music information to be output, music information can be output to the user in a state where it has been changed in accordance with the characteristics of the route.

11. In the above-described embodiment, the music information output from the output device and the image information output from the output device are both associated with characteristics of environment information of a route, and when the music information to be output is identical pieces of music information and the same image information corresponds to the identical pieces of music information, characteristics of one of the identical pieces of music information has been changed based on the associated environment information of the route when the music information is output from the output device.

According to this embodiment, even when there are few types of music information and image information from which the selection is made and there is an overlap in both music information and image information to be output, music information can be output to the user in a state where it has been changed in accordance with the characteristics of the route.

12. A route navigation apparatus of the present embodiment comprises:

a memory; and at least one processor or circuit which functions as:

an obtainment unit configured to obtain each of a first sound based on environment information of a first route and a second sound based on environment information of a second route; and an output control unit configured to perform control so as to output each of the first sound and the second sound, in a selectable manner, to a user so that one of the first route and the second route is selected.

This embodiment makes it possible to provide a route navigation apparatus that, when setting a route to be traveled by a vehicle, can determine the route based on non-verbal information.

13. In the route navigation apparatus of the present embodiment, the obtainment unit obtains each of a first image based on the environment information of the first route and a second image based on the environment information of the second route, and the output control unit further performs control so as to output each of the first image and the second image, in a selectable manner, to the user so that one of the first route and the second route is selected.

According to this embodiment, a route can be determined based on information with which the views and the like are visually associable.

14. A method for controlling a route navigation apparatus of the present embodiment comprises:

outputting music information, in an audible form, to a user, selecting predetermined music information in accordance with an operation that has been made by the user with respect to the output music information, and providing a route corresponding to the selected predetermined music information to the user.

This embodiment makes it possible to provide a control method for a route navigation apparatus that, when setting a route to be traveled by a vehicle, can determine the route based on non-verbal information.

15. An information processing server of the present embodiment is an information processing server that communicates with a route navigation apparatus including: an output device configured to output music information, in an audible form, to a user; a selection unit configured to select predetermined music information in accordance with an operation that has been made by the user with respect to the output music information; and a provision unit configured to provide a route corresponding to the selected predetermined music information to the user, and the information processing server comprises:

a determination unit configured to determine the route corresponding to the predetermined music information based on the predetermined music information.

This embodiment makes it possible to provide an information processing server that can provide a route corresponding to music information to a route navigation apparatus that, when setting a route to be traveled by a vehicle, can determine the route based on non-verbal information.

16. A route navigation system of the present embodiment is a route navigation system comprising a route navigation apparatus and an information processing server, the route navigation apparatus including:

an output device configured to output music information, in an audible form, to a user;

a selection unit configured to select predetermined music information in accordance with an operation that has been made by the user with respect to the output music information; and a provision unit configured to provide a route corresponding to the selected predetermined music information to the user, and the information processing server including:

a determination unit configured to determine the route corresponding to the predetermined music information based on the predetermined music information.

This embodiment makes it possible to provide a route navigation system that, when setting a route to be traveled by a vehicle, can determine the route based on non-verbal information.

What is claimed is:

1. A route navigation apparatus comprising:
an output device configured to output music information, in an audible form, to a user;
a memory; and
at least one processor or circuit which functions as:
a selection unit configured to select predetermined music information in accordance with an operation that has been made by the user with respect to the output music information; and
a provision unit configured to provide, based on atmosphere information corresponding to the selected predetermined music information and route atmosphere information corresponding to each of a plurality of route candidates, a route to the user that corresponds to the route atmosphere information matching the atmosphere information corresponding to the selected predetermined music information, wherein the route is composed of a plurality of sections,
atmosphere information for respective section is obtained based on environment information for respective section, and
atmosphere information corresponding to the route is obtained by specifying the most frequent music information corresponding to the atmosphere information for the respective section.

2. The route navigation apparatus according to claim 1, wherein the output device is capable of further outputting image information corresponding to the output music information.

3. The route navigation apparatus according to claim 1, wherein the at least one processor or circuit further functions as a determination unit configured to determine the route provided by the provision unit to the user based on the atmosphere information corresponding to the selected predetermined music information and the route atmosphere information corresponding to each of a plurality of route candidates.

4. The route navigation apparatus according to claim 1, wherein the at least one processor or circuit further functions as:
a transmission unit configured to transmit the selected predetermined music information to an external apparatus that includes a determination unit configured to determine the route provided to the user based on the atmosphere information corresponding to the received music information and the route atmosphere information corresponding to each of a plurality of route candidates; and
a reception unit configured to receive the route determined by the external apparatus from the external apparatus so as to provide the route via the provision unit.

5. The route navigation apparatus according to claim 1, wherein the music information output from the output device is associated with characteristics of environment information of a route.

6. The route navigation apparatus according to claim 5, wherein the environment information of the route includes information related to a behavior of a vehicle that travels the route.

7. The route navigation apparatus according to claim 6, wherein the information related to the behavior of the vehicle includes at least one of a speed, acceleration, and the number of brake applications of the vehicle that travels the route.

8. The route navigation apparatus according to claim 6, wherein the environment information of the route further includes information of at least one of a road type related to the route, a facility around the route, and an environment around the route.

9. The route navigation apparatus according to claim 5, wherein the music information output from the output device is associated with characteristics of environment information of a route from a current location of the route navigation apparatus.

10. The route navigation apparatus according to claim 5, wherein, when the music information to be output is a plurality of identical pieces of music information, characteristics of one of the identical pieces of music information has been changed based on the associated environment information of the route when the music information is output from the output device.

11. The route navigation apparatus according to claim 2, wherein the music information output from the output device and the image information output from the output device are both associated with characteristics of environment information of a route, and when the music information to be output is identical pieces of music information and the same image information corresponds to the identical pieces of music information, characteristics of one of the identical pieces of music information has been changed based on the associated environment information of the route when the music information is output from the output device.

12. A method for controlling a route navigation apparatus comprising:

outputting music information, in an audible form, to a user;

selecting predetermined music information in accordance with an operation that has been made by the user with respect to the output music information, and providing, based on atmosphere information corresponding to the selected predetermined music information and route atmosphere information corresponding to each of a plurality of route candidates, a route to the user that corresponds to the route atmosphere information matching the atmosphere information corresponding to the selected predetermined music information, wherein the route is composed of a plurality of sections, atmosphere information for respective section is obtained based on environment information for respective section, and atmosphere information corresponding to the route is obtained by specifying the most frequent music information corresponding to the atmosphere information for the respective section.

13. An information processing server that communicates with a route navigation apparatus including: an output device configured to output music information, in an audible form, to a user;

a selector configured to select predetermined music information in accordance with an operation that has been made by the user with respect to the output music information; and a display configured to display a route corresponding to the selected predetermined music information to the user, the information processing server comprising:

a determination unit configured to determine, based on atmosphere information corresponding to the selected predetermined music information and route atmosphere information corresponding to each of a plurality of route candidate, the route to the user that corresponds to the route atmosphere information matching the atmosphere information corresponding to the selected predetermined music information wherein the route is composed of a plurality of sections, atmosphere information for respective section is obtained based on environment information for respective section, and atmosphere information corresponding to the route is obtained by specifying the most frequent music information corresponding to the atmosphere information for the respective section.

14. A route navigation system comprising a route navigation apparatus and an information processing server, the route navigation apparatus including:

an output device configured to output music information, in an audible form, to a user;

a selection unit configured to select predetermined music information in accordance with an operation that has been made by the user with respect to the output music information; and a provision unit configured to provide, based on atmosphere information corresponding to the selected predetermined music information and route atmosphere information corresponding to each of a plurality of route candidates, a route to the user that corresponds to the route atmosphere information matching the atmosphere information corresponding to the selected predetermined music information, and the information processing server including:

a determination unit configured to determine the route corresponding to the predetermined music information, wherein the route is composed of a plurality of sections, atmosphere information for respective section is obtained based on environment information for said respective section, and atmosphere information corresponding to the route is obtained by specifying the most frequent music information corresponding to the atmosphere information for the respective section.

* * * * *